United States Patent [19]
Hsu et al.

[11] Patent Number: 5,955,668
[45] Date of Patent: Sep. 21, 1999

[54] MULTI-ELEMENT MICRO GYRO

[75] Inventors: Ying W. Hsu, Huntington Beach; John W. Reeds, III, San Juan Capistrano; Christ H. Saunders, Laguna Niguel, all of Calif.

[73] Assignee: Irvine Sensors Corporation, Costa Mesa, Calif.

[21] Appl. No.: 09/166,458

[22] Filed: Oct. 5, 1998

Related U.S. Application Data

[63] Continuation-in-part of application No. 08/870,812, Jun. 6, 1997, abandoned
[60] Provisional application No. 60/036,759, Jan. 28, 1997.

[51] Int. Cl.⁶ .................................................. G01P 9/04
[52] U.S. Cl. ........................................ 73/504.12; 73/1.37
[58] Field of Search ........................... 73/504.12, 504.13, 73/504.14, 504.04, 1.37

[56] References Cited

U.S. PATENT DOCUMENTS

| | | | |
|---|---|---|---|
| 5,377,544 | 1/1995 | Dunn | 73/504.12 |
| 5,408,877 | 4/1995 | Greiff et al. | 73/504.12 |
| 5,635,640 | 6/1997 | Geen | 73/504.12 |
| 5,650,568 | 7/1997 | Greiff et al. | 73/504.09 |

*Primary Examiner*—John E. Chapman
*Attorney, Agent, or Firm*—Thomas J. Plante

[57] ABSTRACT

A micro-gyro device is disclosed combining an element which oscillates around the drive axis and an element which rocks around the output axis, so arranged that Coriolis force is transmitted from one element of the other without any substantial transfer of motion of either element to the other in its own direction of motion. In other words, the masses of the two elements operate independently of one another, providing improved performance, and individual adjustability to compensate for any manufacturing imprecision. The presently-preferred device combines an outer ring which oscillates around the drive axis with an inner disk which rocks around the output axis, whenever external rotating motion occurs about the rate axis.

20 Claims, 6 Drawing Sheets

ATTACHED TO RING

FIG. 7

MULTI-ELEMENT MICRO GYRO

This application is a continuation-in-part of application Ser. No. 08/870,812, filed Jun. 6, 1997 abandoned. This application claims the benefit of U.S. Provisional Application Ser. No. 60/036,759, filed Jan. 28, 1997.

BACKGROUND OF THE INVENTION

This invention relates to sensing devices which utilize the gyroscopic principle, i.e., measuring the Coriolis force created by the conservation of momentum of a moving body. Specifically, the invention concerns devices called micro-gyros, which are small and inexpensive. They rely on conservation of momentum of a structure having limited oscillation motion, rather than full rotation. They are able to withstand rough environments for long periods of time.

In this field, the terms used to describe the directions of motions and of forces can be confusing. Applicant in describing and claiming the present invention will refer to the three separate directions (which are orthogonally related to one another) as follows: (a) the driven element, which is cause to oscillate at a predetermined, arbitrary rate inside the gyro, moves around the drive axis; (b) the velocity of the gyro environment, which is to be determined by the gyro, is around the rate axis; and (c) the Coriolis force, which is a function of the velocity of the gyro environment, is measured by motion of a sensing element around the output axis.

A number of patents have been issued to the Charles Draper Laboratory for such micro-gyro sensors, including U.S. Pat. Nos. 5,016,072; 5,203,208; 5,349,855; 5,408,877; 5,535,902; and 5,555,765. The earliest of the listed Draper patents refers to "U.S. Pat. No. 4,598,585 to Boxenhorn, which discloses a planar micro-mechanical vibratory gyroscope adapted for small geometry configurations which may be constructed using semiconductor fabrication mass production techniques".

In Draper U.S. Pat. No. 5,016,072, a single element mass is supported by a system of flexible linkages, made of semiconductor material, to allow for movement in two axes. A system of electrodes drives the mass to vibrate in one axis, and senses the motion of the mass due to Coriolis force in another axis. In another patent issued to Draper, U.S. Pat. No. 5,203,208, the same concept is extended to a symmetrical support linkage system. Draper U.S. Pat. No. 5,349,855 is another micro gyro design wherein an element mass is supported by a system of flexures. The element is driven laterally, and reacts rotationally due to Coriolis force. U.S. Pat. No. 5,408,877 issued to Draper relies on moving a single proof mass along one linear axis, and senses the motion of the same element along an orthogonal axis due to Coriolis force. Draper U.S. Pat. No. 5,555,765 shows a micro gyro using a single mass element formed into the shape of a wheel. By oscillating the wheel mass, a rotation about an axis normal to the plane of the wheel will create Coriolis force that will tilt the wheel.

U.S. Pat. No. 5,359,893 issued to Motorola uses a pair of elements supported in an "H-shaped" linkage frame so that angular velocity can be measured in two perpendicular axes. U.S. Pat. No. 5,488,862 of Neukermans et al involves a design with an outer torsional frame that is excited to tilt about an axis in the plane of the frame; an inner frame responds to the Coriolis force by oscillating (and carrying with it the outer frame) in an axis orthogonal to the outer frame axis. Both the drive and the sensing mechanisms rely on piezo-voltage actuators and sensors mounted on the hinges. In addition to the listed patents, substantial micro-gyro work has been done by the Berkeley Sensor and Actuator Center.

There are several significant defects in the prior art micro-gyros. With the exception of U.S. Pat. No. 5,488,862, reliance is on a single mass element for both driving and sensing functions. This coupling of the driving and output motion severely limits the sensitivity of the gyro. For example, as the single element is driven to vibrate, a key parameter that affects the driving mechanism is the alignment between the element and the drive electrodes. In the presence of an angular rate, the Coriolis force will create a secondary motion on the same element, thereby disturbing the alignment between the mass and the driving electrodes. Complex control schemes are necessary to compensate for such undesirable motions.

Furthermore, with only a single mass element, it is difficult to match the two resonant frequencies. Corrections are limited to support linkages only; any correction made to the mass element will alter both driving and output resonance simultaneously. Another complication is that the proximity of a single element to multiple electrodes leads to stray capacitance and coupled electric fields that are significant sources of electrical noise.

In U.S. Pat. No. 5,488,862, although two elements are used, the design does not allow for independent movement of each element. The outer frame is rigidly connected to the inner frame, so that the two frames essentially behave as a single mass element. When the inner frame rotates, the outer frame rotates with it. Another shortcoming in that design is that the outer frame has severely limited movement, due to typically very small thickness spaces (usually micro meters) in micromachining. The limited rotation of the frame results in low angular momentum, and hence low gyro sensitivity.

In all prior art designs there is also a lack of ability to electronically correct for imbalances of the system due to manufacturing tolerances. The problem is worsened by the use of a single element for drive and output motions. Since the same physical element is driven and sensed, due to mechanical coupling any forces used to balance the mass will often generate undesirable signals that corrupt the intended signal. For the same reason, self-testing of the micro gyro in prior art designs is very difficult.

SUMMARY OF THE INVENTION

The present invention essentially separates the mass (momentum of inertia) of the constant motion element driven to oscillate around the drive axis from the mass (momentum A of inertia) of the variable motion sensing element which creates the measured force.

This may be accomplished using: (a) an outer ring-shaped element which oscillates around the drive axis, and (b) an inner disk-shaped element which oscillates, or rocks, around the output axis as a result of the Coriolis effect. The torque around the output axis may be measured by any suitable means, such as capacitance, magnetic force, piezoelectric or piezorestive effect, or optical signals.

The dual-element configuration permits matching of the resonant frequency of the ring in its oscillation with the resonant frequency of the disk in its rocking. The dual-element structure also permits the ring and the disk to be excited independently, so that each can be dynamically compensated for manufacturing tolerances by counterbalancing.

The sensing element, e.g., the disk, may be supported by a pair of hinges, or flexures, that permit tilting about an axis formed by these hinges. The hinges are connected to posts, or "anchors" which support the entire device on a substrate. The hinges provide mechanical isolation of the gyro from the stresses in the substrate. The design of the anchor hinges can be modified to accommodate either single or dual-axis sensing.

The essential separation of the driven element from the sensing element may also be accomplished using outer and inner rectangular-shaped elements, which are caused to move, respectively, in linear directions along two orthogonal directions

DETAILED DESCRIPTION OF SPECIFIC EMBODIMENTS

Figure 1:
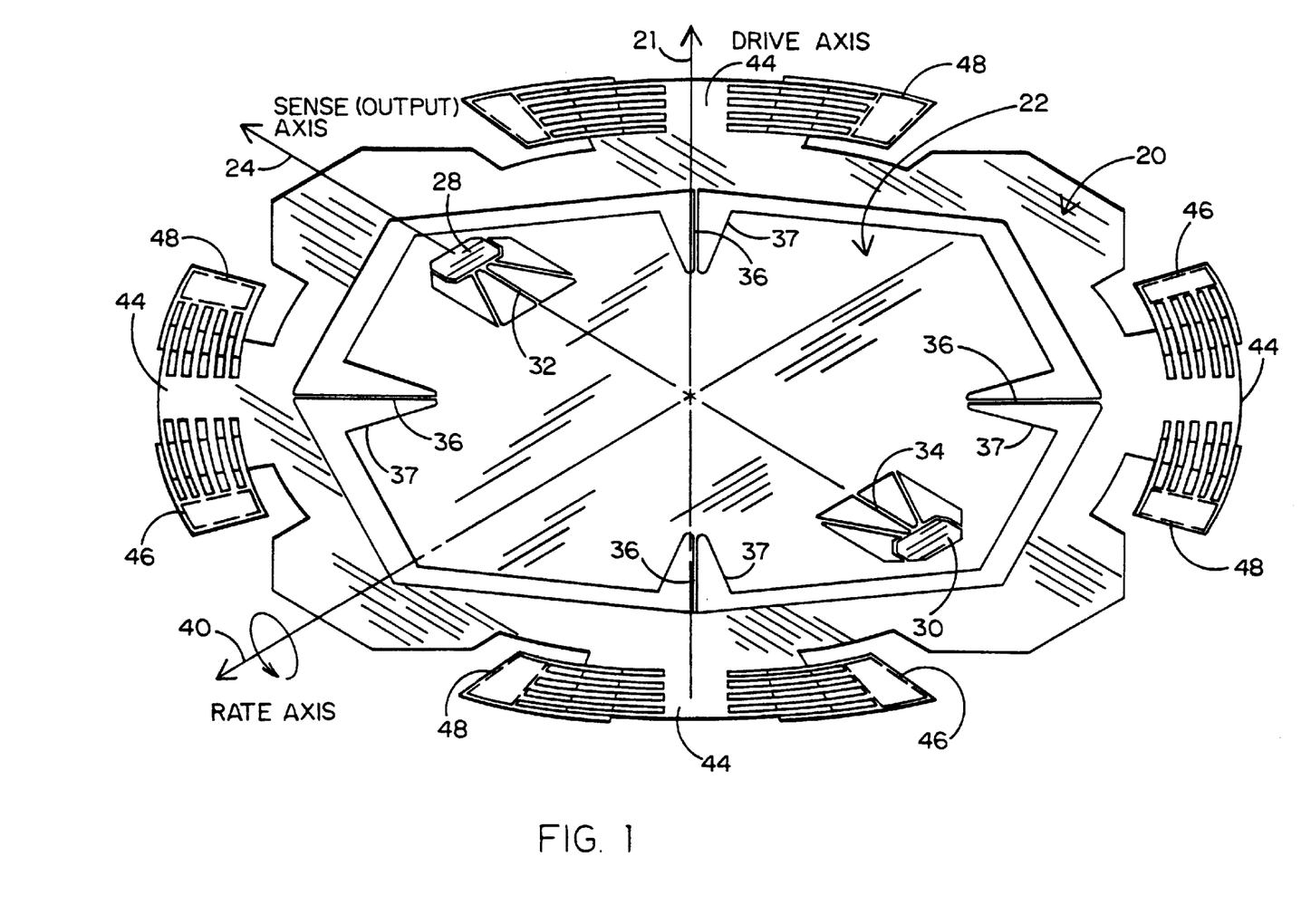
FIG. 1 is an isometric view of the two internally movable parts of a micro-gyro.
Figure 2:
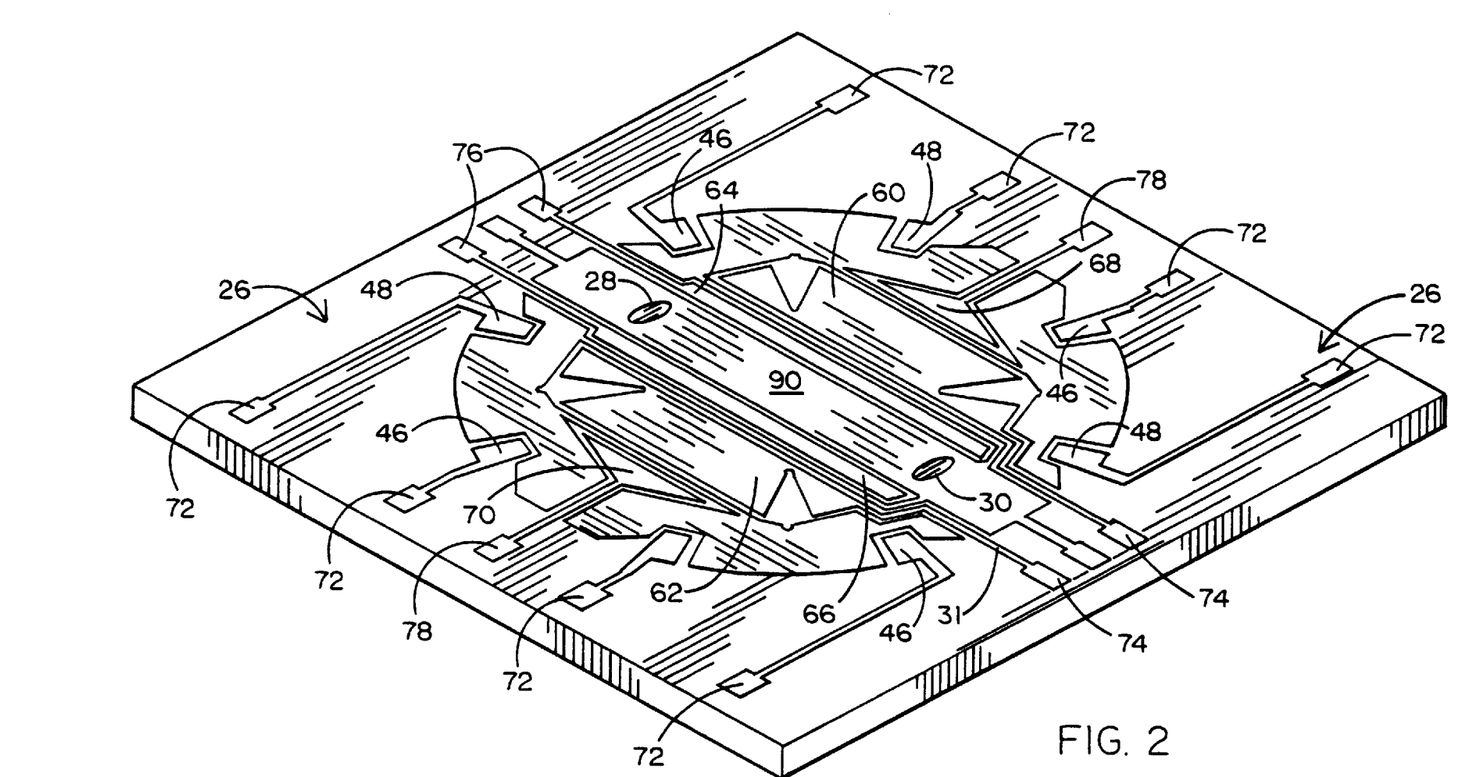
FIG. 2 is an isometric view of the substrate which supports the structure shown in FIG. 1.
Figure 3:
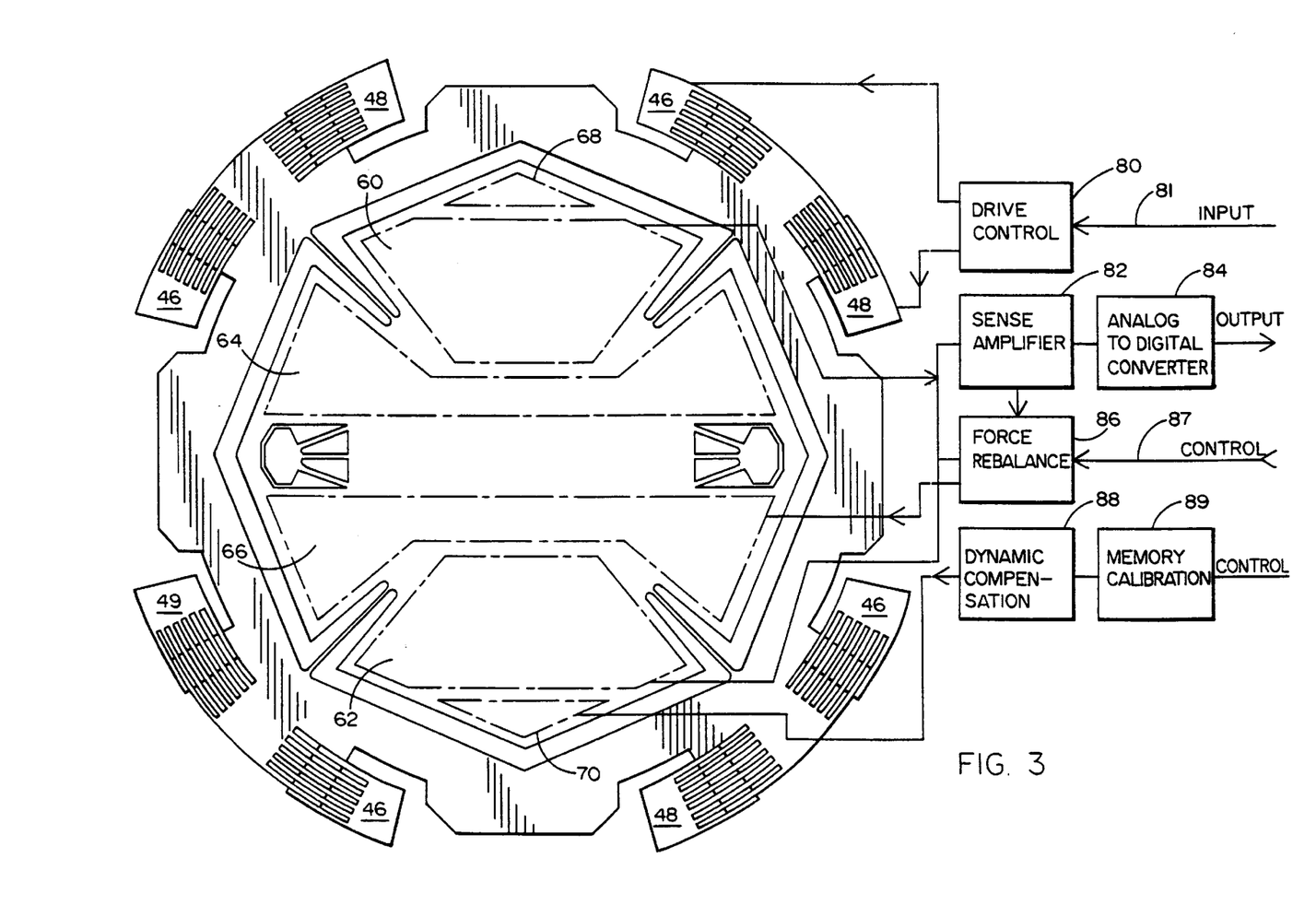
FIG. 3 is a plan view of the micro-gyro of FIGS. 1 and 2, showing a block diagram of the electrical circuitry which connects to the micro-gyro parts and electrodes.

FIGS. 1 and 2 are isometric views showing a micro-gyro device. FIG. 1 shows first and second elements in the micro-gyro, which are movable within the gyro around different axes, the first moving in a vibrating, or oscillating, mode around the drive axis to create a constant driving momentum. The second moves around an output axis normal to the drive axis, in response to the Coriolis force. FIG. 2 shows the substrate, or platform, which supports the first and second elements, and which moves as part of the entire micro-gyro under the influence of external motion which is the value being measured. This external motion is around the rate axis. FIG. 3 is a plan view of the two elements shown in FIG. 1, with an electrical diagram added. The elements of the micro-gyro and the substrate may be formed of silicon chip material (or other easily shaped, inexpensive material).

An outer ring-shaped element 20 is used as the driving element, and an inner disk-shaped element 22 is used as the sensing element. The elements 20 and 22 have essentially independent motion around different axes. The outer element 20 is caused to oscillate at a predetermined rate around a drive axis 21, which is perpendicular to the plane of the micro-gyro. The inner element 22 is caused by Coriolis force to oscillate, or rock, around an output axis 24, which is in the plane of the gyro elements.

The two element gyro is supported on a substrate 26, on which two anchor posts 28 and 30 are mounted. The inner disk element 22 is pivotally mounted on anchor posts 28 and 30 by means of aligned hinges 32 and 34, and is caused by Coriolis force to oscillate, or attempt to oscillate, around the output axis 24. The two anchors 28 and 30 support the disk and ring structures 20 and 22, and also space the movable elements 20 and 22 from the substrate 26. The location of anchors 28 and 30 is within the space surrounded by ring element 20, in order to enhance the separation of motion of the driving and sensing elements.

The inner element 22 is connected to the outer element 20 by means of a plurality of spokes, or flexures, 36. The preferred number of spokes is four, as shown. Each spoke 36 is 45° from the output axis 24, and also 45° from the rate axis 40, which is the axis of motion of the external velocity being measured. The spokes 36 are very narrow, and are quite long, so they do not restrict the movement of the sensing element 22, and permit essentially free relative movement of the sensing element 22 and the driving element 20. The spokes 36 transfer the Coriolis force from the outer element 20 to the inner element 22. The disk has four notches 37 to accommodate the desired length of spokes 36. The dimensions of the flexures 36 are determined, in part, by the material of which they are formed. For example, using polysilicon material, the width of the flexures preferably would be in the range of 2–4 microns, and their length would be designed to provide the desirable functional results. Their thickness is determined by the material and process limitations, e.g., 2–10 microns for polysilicon.

A plurality of thin links, or flexures, are used to connect each anchor 28 and 30 to the inner element 22. In the drawing, three such links are shown at 32 connecting anchor 28 to inner element 22, and three such links are shown at 34 connecting anchor 30 to inner element 22. The slender links provide maximum mechanical isolation of the gyro elements 22 and 20 from the substrate 26. The triangular arrangement of the three link structures at each anchor provides the best combination of (a) high resistance to motion of disk element 22 around the drive axis 21, with (b) low, or soft, resistance to motion of disk element 22 around the output axis 24. The width of the flexures 32 and 34 preferably would be in the range of 3–5 microns, and their length would be designed to provide the desirable functional results. Thickness would be determined by the material used.

The ring element 20 can be caused to oscillate by different means, e.g., electrostatic, magnetic, piezoelectric. As shown, its oscillation is caused by electrostatic forces acting on a plurality of short arms, or protrusions, 44 extending outwardly from the ring element 20. Four such arms are shown, each located in line with one of the spokes 36. Each of the arms 44 interacts with, and is caused to oscillate by, a pair of electrode pads 46 and 48 mounted on the substrate 26 in proximity to the respective arm.

Figure 4:
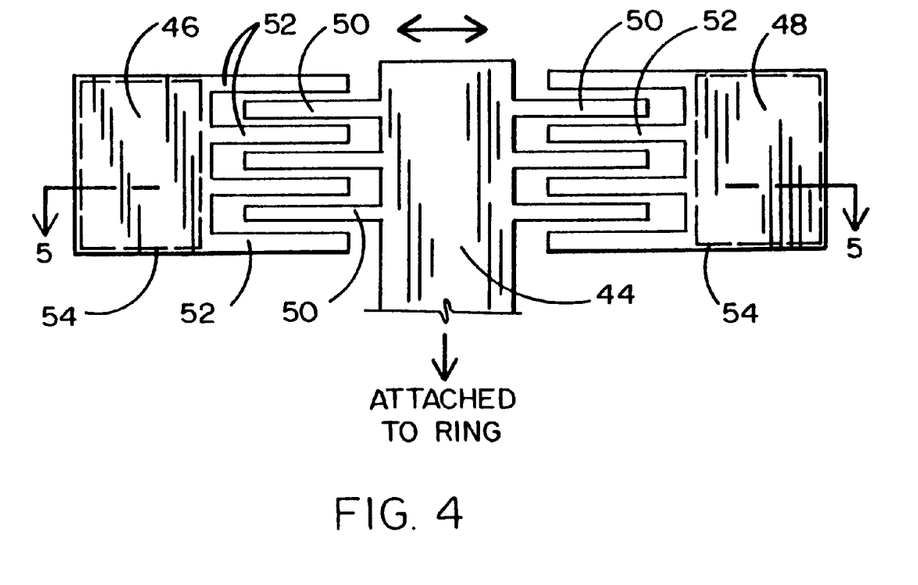
FIG. 4 is a plan view enlargement of a portion of the micro-gyro.
Figure 5:
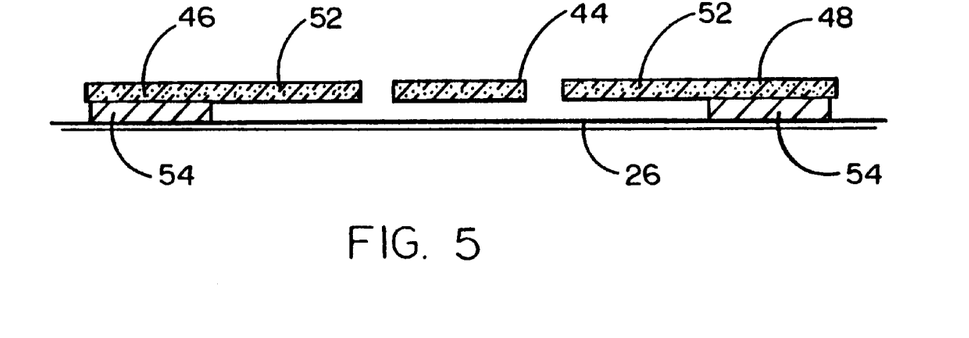
FIG. 5 is a section on the line 5—5 of FIG. 4.

FIG. 4 is a plan view enlargement of the electrode driving arrangement; and FIG. 5 is a cross-section taken on line 5—5 of FIG. 4. To maximize the available oscillating force a plurality of laterally extending fingers 50 extend from each side of each arm, and are interleaved with a plurality of fingers 52 extending from the adjacent electrode pad 46 or 48. The two interleaved sets of fingers 50 and 52 do not engage one another, but are located as close as feasible, in order to maximize effectiveness of the electrostatic forces. As shown the fingers 52 extending from electrodes 46 and 48 are located in the same plane as the fingers 50 extending from each arm 44, because each electrode pad is mounted on a spacer 54 between the respective electrode pad 46 or 48 and the substrate 26.

The ring element 20 is excited to oscillate about its center (drive) axis 21. The radial spokes 36 accommodate this motion by bending slightly; the same spokes also provide the mechanical spring force that returns the ring element 20 to its initial position. When the substrate 26 is stationary with no external rotation, the ring element will oscillate, and the disk element 22 will remain stationary. When the substrate is rotated by a rate ($\Omega$) about the rate axis 40, the Coriolis force generated by the ring 20 and the rotational rate ($\Omega$) will cause the disk 22 to vibrate about the sense (output) axis 24, formed by the anchor hinges 32 and 34. The anchor hinges are preferably a triangular three-flexure structure to enhance the resistance to torsional loads from the oscillating ring element 20. By operating near the resonant frequencies, and matching the frequencies of the ring 20 (around axis 21) and of the disk 22 (around axis 24), the energy is efficiently transferred from the ring to the disk, and the small Coriolis forces are effectively measured. By detecting the motion of the disk 22, the Coriolis, hence rate $\Omega$, can be determined. When the disk 22 rocks, the supporting anchor hinges bend slightly to permit a small rotation of the disk about the output axis 24.

The oscillation of ring element 20 may be established by applying a differential voltage between the fingers 50 connected to the ring element and the fingers 52 connected to the electrical pads mounted on the substrate. By alternating the potential on the electrode pads 46 and 48, ring element 20 can be driven into oscillation around its axis 21, i.e., motion of each arm 44 back and forth between electrode pads 46 and 48.

The output, or sensed, value is detected by measuring the rocking motion of disk-element 22 around its axis 24. There are several ways for sensing such movement. Available methods include measuring changes in capacitance, piezoelectric, magnetic, and optical. In the preferred embodiment, capacitance is used as the sensing medium. In FIG. 2, electrodes 60 and 62 on substrate 26 are used to detect the change in capacitance when the disk 22 oscillates. The disk 22 and the electrodes 60 and 62 form pairs of parallel capacitors; when the distance between the disk and the electrode changes, the value of capacitance also changes. This capacitance change can be measured by using electrical circuits known to those skilled in the art. The two sensing electrodes 60 and 62 operate in the opposite sense, i.e., when one capacitor increases, the other decreases. The opposite sensing capacitors provide a way to accomplish differential sensing, which results in improved sensitivity. In the differential mode, as opposed to the absolute mode, the effects of environment and electrical noise are drastically reduced, because these effects are canceled out. All effects that affect both capacitors are eliminated from the sensing circuit.

The micro-gyro can be operated in two different modes: open-loop, or closed-loop. In the open-loop mode, the disk 22 is free to rotate whenever a Coriolis force is generated. The amplitude of the disk's movement is the measure of the rate. In the closed-loop mode, the disk 22 is actively maintained in a known position (null), through the use of feedback and a mechanism for forcing the disk 22 into the null position. In closed-loop mode, the electrical voltage (or current) necessary to counteract the Coriolis force becomes the measure of rate. In closed-loop, the sensitivity of the micro gyro is not changed, but the maximum rate detectable is greatly increased, and time needed for detection is significantly reduced.

In FIG. 2, electrodes 64 and 66 are the rebalancing electrodes. In operation, an electrical potential is applied to the rebalancing electrodes and the disk 22. The voltage necessary to maintain the disk in the null position is controlled, based on the feedback from the main sensing electrodes 60 and 62.

The combination of the sensing electrodes 60 and 62 and rebalancing electrodes 64 and 66 also provides a means for self-testing the micro gyro. To do so, the rebalancing electrodes 64 and 66 are intentionally injected with a voltage that tilts the disk 22. The resulting movement can be verified with the sensing electrodes 60 and 62. The measured change, for example in capacitance value, can be compared to the values stored in memory for acceptable values obtained during calibration. In this manner, the sensor can be tested at the start of every application. The self-testing capability is particularly crucial for applications where high reliability and safety are involved.

The micro-gyro also incorporates a feature for correcting the imbalances due to manufacturing tolerances. For example, due to tolerances, the disk 22 may not be exactly situated on the center defined by the anchor hinges 28 and 30. This imbalance can generate an offset in the output signal that reduces the gyro's detection range. Correction electrodes 68 and 70 function in the same manner as the rebalancing electrodes 64 and 66, except that the correction electrodes are used to correct for imperfections in the structure due to manufacturing tolerances.

Another application of the correction electrodes 68 and 70 is for frequency matching. By providing a small force opposing the disk's movement, the resonant frequency of the disk can be adjusted. Mechanical and electrical adjustments in the design can be used for frequency matching. Mechanical adjustments may be made by changing slightly the geometry of flexures 32, 34 and 36. Electrical adjustments for disk 22 may be made by pulling it down electrostatically to pre-load the flexures 32 and 34. Electrical adjustments for ring 20 may be made by using a bias in the voltage used to drive the comb, i.e., the fingers 50.

FIG. 2 also shows terminal pads which connect to separate electrodes on the substrate 26, and which are available for wire bond connecting to circuitry external to the micro-gyro. Current microelectronic manufacturing techniques also permit integration of the gyro sensing elements and electronic circuitry onto a monolithic substrate.

FIG. 3 is a plan view of the micro-gyro, together with a block diagram of the electrical system which interacts with the micro-gyro. The electrodes 46 and 48 shown in FIG. 2 are arranged in pairs adjacent to each of the four arms, or protrusions, 44, and are connected to eight terminal pads 72 on substrate 26. The sensing electrodes 60 and 62 on substrate 26 are connected, respectively, to two terminals pads 74. The rebalancing electrodes 64 and 66 are connected, respectively, to two terminal pads 76. The correction electrodes 68 and 70 are connected, respectively, to two terminal pads 78.

The ring 20 and the disk 22 are connected to a constant voltage through the anchors 28 and 30. A reference voltage, e.g., 5 volts is maintained in the disk 22 and ring 20. The voltages on the electrodes 46 and 48, which are used to drive the ring into oscillation, are alternated at each electrode between values above and below the 5 volt reference value. For example, an 8 volt range may be used, from 1 volt to 9 volts. When the four electrodes 46 are at 1 volt, the four electrodes 48 are at 9 volts. These values are reversed at a frequency which causes the ring 20 to oscillate at or near its resonant frequency. The ratio of the mass of ring 20 to the mass of disk 22, or more correctly the ratio of the momentum of inertia of ring 20 (around axis 21) to the momentum of inertia of disk 22 (around axis 24), are designed to have both the ring and disk vibrating at or near their resonant frequencies, whenever the micro-gyro is creating a Coriolis force which is to be measured.

The force acting on the disk 22, tending to cause its rocking, or vibratory, motion is detected by the electrodes 60 and 62. And their capacitance values are countered by electrodes 64 and 66, in order to maintain the disk 22 essentially in null position, while sensing the value of the Coriolis force.

In FIG. 3, the electrodes 60 and 62, 64 and 66, and 68 and 70 are shown in dashed lines below the disk 22. In the block diagram at the right of the figure, drive control circuitry to oscillate the ring 20 is indicated at 80. It receives input signals on line 81, and sends control signals to the electrode pads 46 and 48. The sensing amplifier circuitry is indicated at 82; it is shown receiving signals from electrodes 60 and 62 and outputting signals through A to D circuitry at 84 to line 85. The force rebalancing circuitry is indicated at 86, with control signals entering on line 87, and with its output signals feeding to the balancing electrodes 64 and 66. The dynamic compensation circuitry is indicated at 88, with its entering signals from memory circuitry indicated at 89, and its output signals feeding to the correction electrodes 68 and 70.

In FIG. 2, a ground-connected rectangular pad (electrode) 90 at the center of the substrate serves as a ground shield to minimize noise and maximize sensitivity at the sensing electrodes. Because the substrate 26 is formed of silicon material, it is necessary to provide a thin insulating layer, e.g., silicon nitride material, between the substrate and the electrically conducting portions of the micro-gyro (anchors, disk, ring, sensing electrodes).

It is important to minimize the mechanical interconnection between the gyroscopic ring element and the output sensing disk element. However, the Coriolis effect has to be transmitted from the ring to the disk, and the ring relies for its support above the substrate on the anchors of the disk. The vibratory oscillating motion of the ring 20 around drive axis 21 does not move the disk 22 around that axis; and the vibratory rocking motion of the disk 22 around the output (sensing) axis 24 does not move the ring 20 around that axis. Any energy tending to create such undesired motions is absorbed in the structure with substantially no effect.

The important effect transmitted between the ring and disk is the Coriolis force which causes the disk 22 to vibrate around output axis 24. That force is caused by coexistence of (a) motion of the entire micro-gyro around the rate axis 40, and (b) the momentum of inertia of the ring 20 around drive axis 21.

The vibration of ring 20 around drive axis 21 should be at its resonant frequency; and the vibration of disk 22 around output axis 24 should be at the same resonant frequency. In the experimental tests of the micro-gyro shown in FIGS. 1–5, that resonant frequency (both elements) is approximately 2800 hertz. The resonant frequency of ring 20 is obtained by means of the electrical alternation of voltages. The resonant frequency of disk 22 is obtained by adjustment of the mechanical design of the micro-gyro components. The most effective way of "fine-tuning" the mechanical design to cause matching resonant frequencies of the elements 20 and 22 is working with the flexures (or hinges) 32 and 34 which connect element 22 to its anchors, and with the flexures (or spokes) 36 which connect element 20 to element 22. Adjusting the sizes of the flexures 32, 34, and 36 provides a simple and effective way of matching the resonant frequencies of elements 20 and 22.

As is known to those skilled in the art of dynamic energy transmission (e.g., micro-gyros), as distinguished from static energy transmission (e.g., mechanical lever systems), the transfer of energy from one part to another in a dynamic system, which relies on resonant frequencies, dictates that the resonant frequency of the energy receiving part should match the resonant frequency of the energy transmitting part. And, also, an inherent objective is to minimize possible energy transmission in other directions, using a design which isolates resonant frequencies to prevent undesired energy transmission. For example, the only desired energy transmission in the present invention is the Coriolis effect from the motion of ring element 20 around the drive axis 21 to cause motion of disk element 22 around the output axis 24. Transmission of motion from ring element 20 cannot cause substantial motion of disk element 22 around the drive axis 21 because of anchors 28 and 30. Transmission of energy from disk element 22 around output axis 24 to ring element 20 around output axis 24 is substantially prevented by isolation of the respective resonant frequencies. As an example of the desired frequencies, the resonant frequency of ring element 20 around the drive axis 21 may be 2,800 hertz; the resonant frequency of disk element 22 around output axis 24 should be the same, 2,800 hertz; and the resonant frequency of ring element 20 around the output axis 24 should be much different, e.g., 800 hertz. Obtaining resonant frequencies which match one another where desired, and which are isolated from one another in other relationships, is accomplished primarily by adjusting mass and structural thickness of elements in the design geometry. As stated in the previous paragraph, adjusting the widths and lengths of the flexures in the micro-gyro is the most effective way of fine-tuning the design.

Various other micro-gyro designs can provide the desired mechanical isolation of the part moving around the drive axis from the part moving around the output axis, except for the transmission of Coriolis force.

Figure 6:
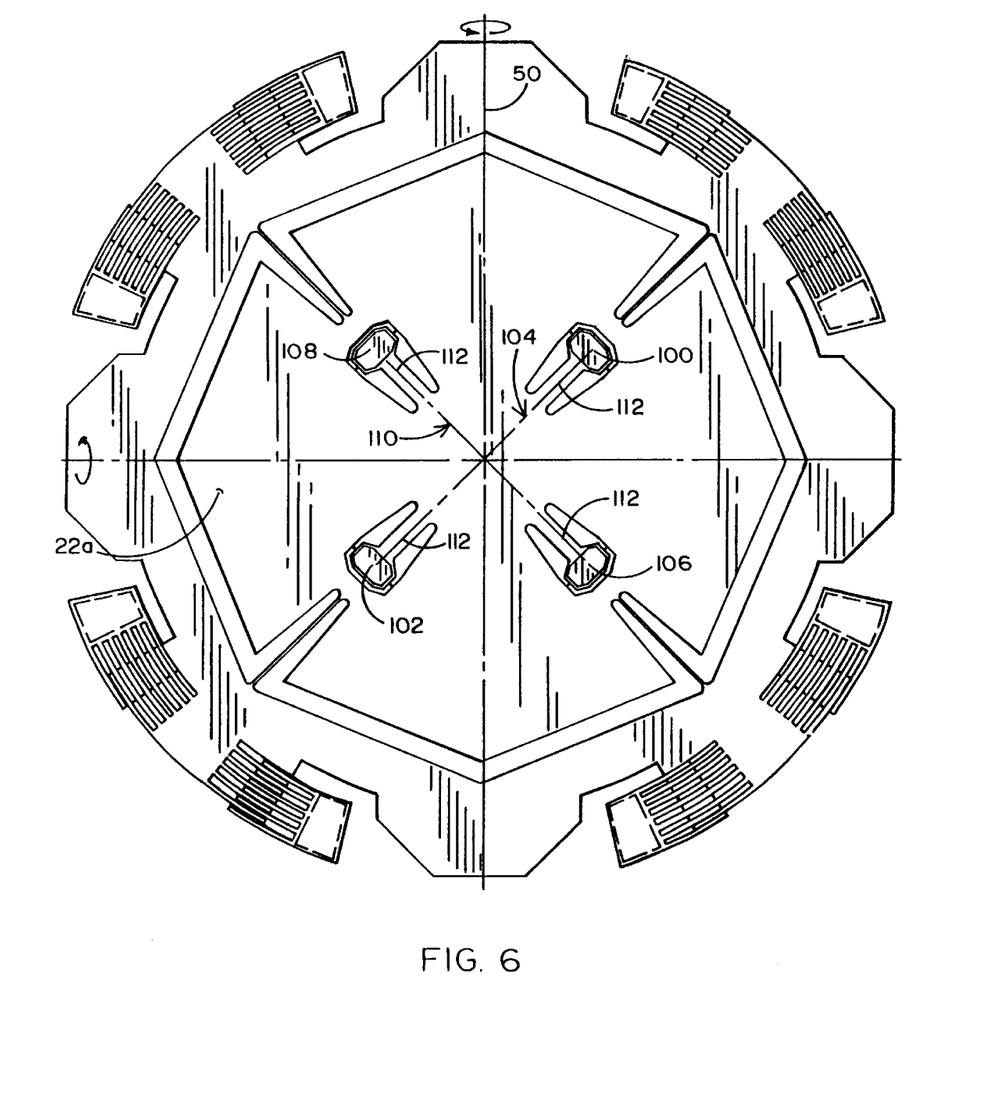
FIG. 6 is a plan view of a micro-gyro so mounted that it can sense rates in either of two axes.

FIG. 6 illustrates a micro-gyro in which a disk 22a is mounted so it can sense rates in two axes. This is accomplished by using two sets of anchors. Anchors 100 and 102 provide an axis 104, around which the disk 22a may rock. Anchors 106 and 108 provide an axis 110, at right angles to axis 104, around which disk 22a may rock. Each of the four anchors is mechanically connected to the disk by an axially-extending pivot link, or flexure, 112. Note that the single flexure 112 is wider than each of the three triangulated flexures 32 or 34 in FIG. 1.

Figure 7:
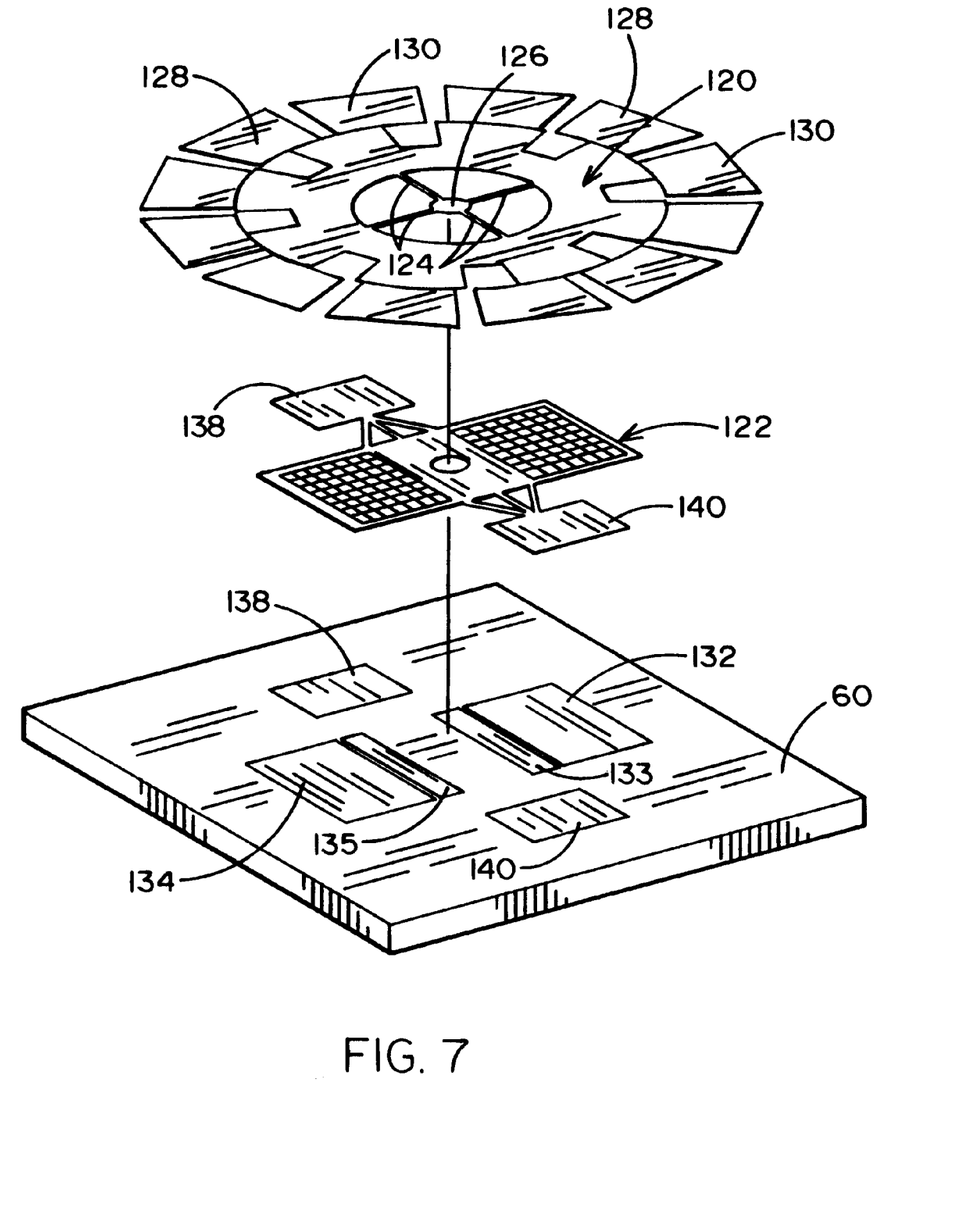
FIG. 7 is an isometric exploded view of an alternative micro-gyro design.

FIG. 7 shows an alternative design, in which the drive element 120, which vibrates around the drive axis, is positioned above or below the sensing element 122, which deforms by bending around the output axis. As in the previous designs, the driving element 120 is a ring, but in this design the sensing element is a rectangular plate. Electrodes 128 and 130 are used to provide an electrostatic force to move the ring. Sensing electrodes 132 and 134 are placed on the substrate underneath the plate 122 to sense the output motion. Electrodes 133 and 135 are used for rebalancing. The plate 122 connects to the substrate 136 through anchors 138 and 140.

When ring 120 is driven into oscillation about the center post 126, four radial spokes, or flexures, 124 bend slightly to accommodate the motion. The radial spokes 124 are connected to center post 126 secured to the rectangular plate 122. When the device is rotated, the plate 122 will bend slightly and oscillate due to Coriolis force. As before, the resonant frequency of bending of plate 122 is designed to match the rotational resonant frequency of ring 120. The bending of the ring 120 about the sensing axis is dynamically isolated by shifting its resonant frequency away from that of the plate 122 bending frequency. In this fashion the Coriolis energy from the ring 120 is efficiently channeled into bending of the plate 122, while isolating the plate from driving the ring.

The main advantage of the two-tier design in FIG. 7 is that, by placing the elements over each other, the finished design uses the area more efficiently and results in a more compact device. With smaller sizes, a larger number of devices can be produced in a single wafer. Another benefit of the two-tiered approach is further isolation of the drive element 120 and output element 122. The radial flexures 124 are connected to the center post 126, and have less restraining effect on the movement of the output element 122.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A micro-gyro device for detecting rotational movement about an input axis, comprising:

a drive element which vibrates in a drive direction to generate Coriolis force in response to movement about the input axis, said drive element vibrating at or near its resonant frequency in the drive direction;

an output element which receives Coriolis force from the drive element to cause the output element to vibrate in an output direction perpendicular to the drive direction, said output element under Coriolis force vibrating at or near its resonant frequency in the output direction, which frequency is substantially similar to the resonant frequency of the drive element in the drive direction, in order to enhance transfer of Coriolis force from the drive element to the output element;

said drive element having a resonant frequency in the output direction which is substantially different from its resonant frequency in the drive direction; and linkage connecting the drive element to the output element to transfer Coriolis force, said linkage permitting the drive element and output element to be essentially decoupled from one another except for transfer of Coriolis force, so that vibrating motion of the drive element in the drive direction does not cause substantial motion of the output element in the drive direction, and vibrating motion of the output element in the output direction does not cause substantial motion of the drive element in the output direction.

2. The micro-gyro device of claim 1 in which the vibrating motion of the drive element is oscillation about a drive axis, and the vibrating motion of the output element is rocking oscillation about an output axis.

3. The micro-gyro device of claim 2 in which the entire device is adapted to vibrate around a rate axis due to rotational forces on the device, thereby developing a Coriolis effect measured by the output element.

4. The micro-gyro device of claim 3 which includes:

a substrate element which supports both the drive and output elements; and electrodes on the substrate element which are used in measuring the Coriolis force which causes rocking oscillation of the output element.

5. The micro-gyro device of claim 4 in which one or more electrodes on the substrate respond to the rocking motion of the output element, and one or more of the electrodes on the substrate create a balancing force which maintains the output element essentially in a null position.

6. The micro-gyro device of claim 5 which also comprises means for self-testing the micro-gyro prior to operation; said means including the same electrodes used to create the null position balancing force.

7. The micro-gyro device of claim 5 which also includes:

one or more electrodes on the substrate which create a correction force on the output element which compensates for imbalances due to manufacturing imprecision.

8. The micro-gyro device of claim 4 in which the drive element is an outer ring-shaped element, and the output element is an inner disk-shaped element.

9. The micro-gyro device of claim 8 which includes:

an anchor structure mounted on the substrate, within the area surrounded by the outer element, which supports, and provides a rocking axis for, the output element; and a plurality of thin spoke-like members which connect the drive element to the output element.

10. The micro-gyro device of claim 9 which includes:

outwardly-extending arms on the ring-shaped element; and electrodes mounted on the substrate adjacent to the arms to provide driving force on the arms for causing oscillation of the ring-shaped element.

11. The micro-gyro device of claim 9 in which:

the anchor structure comprises two posts mounted on the substrate at diametrically opposite edges of the inner disk-shaped element.

12. The micro-gyro device of claim 11 in which each anchor post is connected to the adjacent edge of the inner disk-shaped element by three triangularly arranged flexures.

13. The micro-gyro device of claim 11 in which there are four thin spoke-like members connecting the inner disk-shaped element to the outer ring-shaped element, each of such members being spaced approximately 45° from the closest anchor post.

14. The micro-gyro device of claim 13 in which each anchor post is connected to the adjacent edge of the inner disk-shaped element by three triangularly arranged flexures.

15. The micro-gyro device of claim 8 which includes:

outwardly-extending arms on the ring-shaped element; and electrodes mounted on the substrate adjacent to the arms to provide driving force on the arms for causing oscillation of the ring-shaped element.

16. The micro-gyro device of claim 4 in which the drive element is a ring-shaped element, and the output element is a substantially rectangular-shaped element.

17. The micro-gyro device of claim 2 in which the drive element is an outer ring-shaped element, and the output element is an inner disk-shaped element.

18. The micro-gyro device of claim 2 in which the drive element is a ring-shaped element, and the output element is a substantially rectangular-shaped element.

19. A micro-gyro device for detecting rotational movement about an input axis, comprising:

a drive element which vibrates in a drive direction to generate Coriolis force in response to movement about the input axis;

an output element which receives Coriolis force from the drive element to cause the output element to vibrate in an output direction perpendicular to the drive direction, said output element constituting the primary mass which is driven by the Coriolis force; and flexures connecting the drive element to the output element to transfer Coriolis force, said flexures permitting the drive element and output element to be essentially decoupled from one another except for transfer of Coriolis force, so that vibrating motion of the drive element in the drive direction does not cause substantial motion of the output element in the drive direction, and vibrating motion of the output element in the output direction does not cause substantial motion of the drive element in the output direction.

20. The micro-gyro device of claim 19 in which the vibrating motion of the drive element is oscillation about a drive axis, and the vibrating motion of the output element is rocking oscillation about an output axis.

* * * * *